United States Patent
Damodharan et al.

(10) Patent No.: US 9,658,925 B1
(45) Date of Patent: May 23, 2017

(54) SYSTEMS AND METHODS FOR RESTORING APPLICATION DATA

(75) Inventors: Prabhu Damodharan, Shoreview, MN (US); Joseph Milton Gilpin, Blain, MN (US); Robert Meierhofer, Woodbury, MN (US); Lowell Palecek, White Bear, MN (US); Curtis Peterson, Blaine, MN (US); Matthew Reker, Blaine, MN (US); Larry Schiefelbein, Forest Lake, MN (US); Hermeher Sekhon, Blaine, MN (US); Robert Wilde, St. Michael, MN (US); Martin Annoni, White Bear Township, MN (US)

(73) Assignee: Veritas Technologies, Mountain View, CA (US)

( * ) Notice: Subject to any disclaimer, the term of this patent is extended or adjusted under 35 U.S.C. 154(b) by 803 days.

(21) Appl. No.: 13/285,091

(22) Filed: Oct. 31, 2011

(51) Int. Cl.
*G06F 11/14* (2006.01)

(52) U.S. Cl.
CPC ...... *G06F 11/1458* (2013.01); *G06F 11/1471* (2013.01)

(58) Field of Classification Search
CPC ............ G06F 11/1451; G06F 11/1446; G06F 11/1448; G06F 11/1458
See application file for complete search history.

(56) References Cited

U.S. PATENT DOCUMENTS

| | | | |
|---|---|---|---|
| 2011/0047340 A1* | 2/2011 | Olson et al. | 711/162 |
| 2011/0051183 A1* | 3/2011 | Kanemitsu | H04N 1/00 358/1.15 |
| 2012/0233222 A1* | 9/2012 | Roesch | 707/812 |

* cited by examiner

*Primary Examiner* — Barboucarr Faal
(74) *Attorney, Agent, or Firm* — FisherBroyles LLP

(57) ABSTRACT

A computer-implemented method for restoring application data may include (1) identifying a virtual disk image used by a virtual machine to represent a volume of data within the virtual machine used for storage by an application within the virtual machine, (2) identifying a request to back up the virtual disk image, and, in response to the request, (3) identifying, within the volume of data, at least one file including application data used by the application, (4) generating application metadata and a catalog associating a logical view of the application data with the file, the logical view being based on application logic of the application, (5) backing up the virtual disk image, and (6) associating the catalog with the backed up virtual disk image. Various other methods and systems are also disclosed.

20 Claims, 7 Drawing Sheets

SYSTEMS AND METHODS FOR RESTORING APPLICATION DATA

BACKGROUND

In the digital age, organizations increasingly rely on digitally-stored data. To protect against data loss, an organization may use a backup system to back up important data. In some cases, an organization may handle and store data via virtual machines. Accordingly, a backup system may back up a virtual machine disk image to preserve data handled by a virtual machine.

Unfortunately, backup and restore systems may consume significant amounts of computing resources. For instance, backups may consume storage space, and transferring data for backing up and/or restoring data may consume I/O bandwidth and network bandwidth. Additionally, the more data there is to backup and/or restore, the longer backup and restore operations may take to perform. By competing for computing resources, backup and restore operations may sometimes interfere with the performance of primary applications.

In an attempt to improve the efficiency and flexibility of restorations, an organization may, in addition to backing up a virtual machine disk image, create a separate backup of files (e.g., corresponding to a specific application) within the virtual machine disk image that the organization may wish to restore without restoring the entire virtual machine disk image. Unfortunately, such redundant backups may consume additional computing resources up front in the attempt to improve the efficiency and flexibility of later restorations. Accordingly, the instant disclosure identifies and addresses a need for additional and improved systems and methods for restoring application data.

SUMMARY

As will be described in greater detail below, the instant disclosure generally relates to systems and methods for restoring application data by cataloging application data within a virtual machine (e.g., creating a view of the application data corresponding to the associated application), backing up a disk image of the virtual machine, and associating the application data catalog with the backup of the disk image. In some examples, these systems and methods may later restore the application data from the disk image based on the catalog. In one example, a computer-implemented method for restoring application data may include (1) identifying a virtual disk image used by a virtual machine to represent a volume of data within the virtual machine used for storage by an application within the virtual machine, (2) identifying a request to back up the virtual disk image, and, in response to the request, (3) identifying, within the volume of data, at least one file including application data used by the application, (4) generating a catalog associating a logical view of the application data with the file, the logical view being based on application logic of the application, (5) backing up the virtual disk image, and (6) associating the catalog with the backed up virtual disk image.

In some examples, the computer-implemented method may also include generating a map that indicates an offset within the virtual disk image at which the file is stored. In one example, generating the catalog may include generating the catalog using an agent executing within the virtual machine. In some embodiments, backing up the virtual disk image may include backing up the virtual disk image in a virtual disk image format.

In one embodiment, an additional computer-implemented method for restoring application data may include (1) identifying a backup of a virtual disk image, (2) identifying a request to restore a subset of data from the backup of the virtual disk image, the subset of data being defined by a logical view of an application, and, in response to identifying the request, (3) identifying a catalog associated with the backup of the virtual disk image, the catalog mapping the logical view of the application to at least one location of the subset of data within the backup of the virtual disk image, and (4) retrieving the subset of data from the backup of the virtual disk image based on the catalog.

In some examples, the catalog may map the logical view of the application to at least one location of the subset of data by mapping the logical view of the application to at least one file within the virtual disk image that includes at least a portion of the subset of data. In these examples, the additional computer-implemented method may also include identifying a map that indicates an offset within the virtual disk image at which the file is stored, and retrieving the subset of data from the backup may be further based on the map. Additionally or alternatively, retrieving the subset of data from the backup of the virtual disk image may include (1) retrieving the file from the backup of the virtual disk image, (2) identifying, based on the logical view of the application, a location within the file at which at least a portion of the subset of data resides, and (3) retrieving the portion of the subset of data from the location within the file.

In some examples, retrieving the subset of data may include retrieving the subset of data from the backup of the virtual disk image without mounting the virtual disk image. In one example, retrieving the subset of data may include retrieving the subset of data from a sequential access storage device in sequential order.

In one embodiment, a system for implementing the above-described method may include an identification module programmed to (1) identify a virtual disk image used by a virtual machine to represent a volume of data within the virtual machine used for storage by an application within the virtual machine, (2) identify a request to back up the virtual disk image, and, in response to the request, (3) identify, within the volume of data, at least one file including application data used by the application. The system may also include a generation module programmed to generate a catalog associating a logical view of the application data with the file, the logical view being based on application logic of the application. The system may additionally include a backup module programmed to back up the virtual disk image. The system may further include an association module programmed to associate the catalog with the backed up virtual disk image. The system may also include at least one processor configured to execute the identification module, the generation module, the backup module, and the association module.

As will be explained in greater detail below, by cataloging application data within a virtual machine, backing up a disk image of the virtual machine, and associating the application data catalog with the backup of the disk image, the systems and methods described herein may facilitate application-granular restoration of data for virtual machines from virtual disk images (e.g., without requiring separate application-granular backups or full restorations). Accordingly, these systems and methods may increase the efficiency and/or flexibility of backup and restore operations relating to applications within virtual machines.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
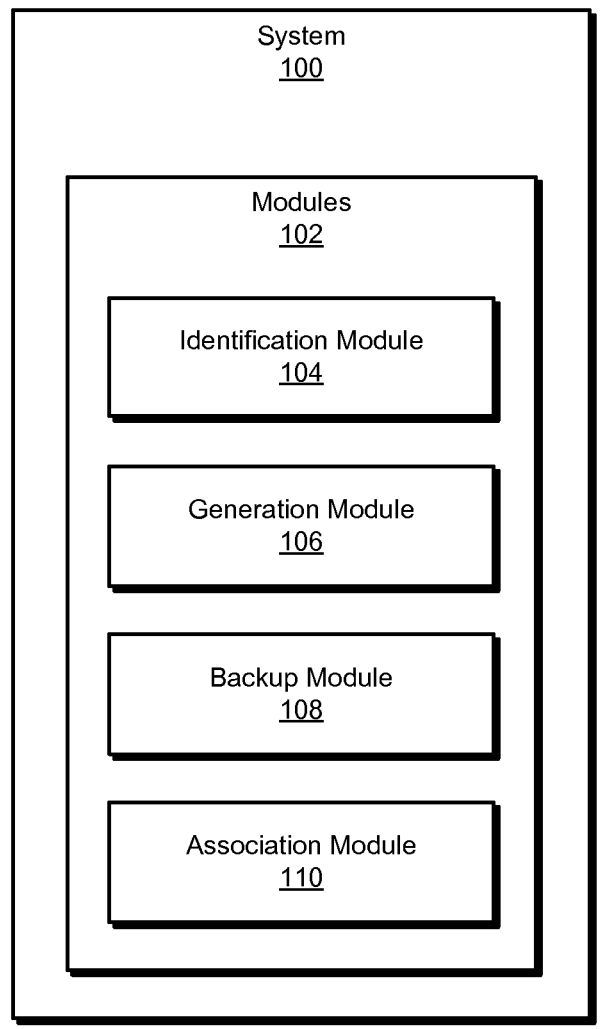
FIG. 1 is a block diagram of an exemplary system for restoring application data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
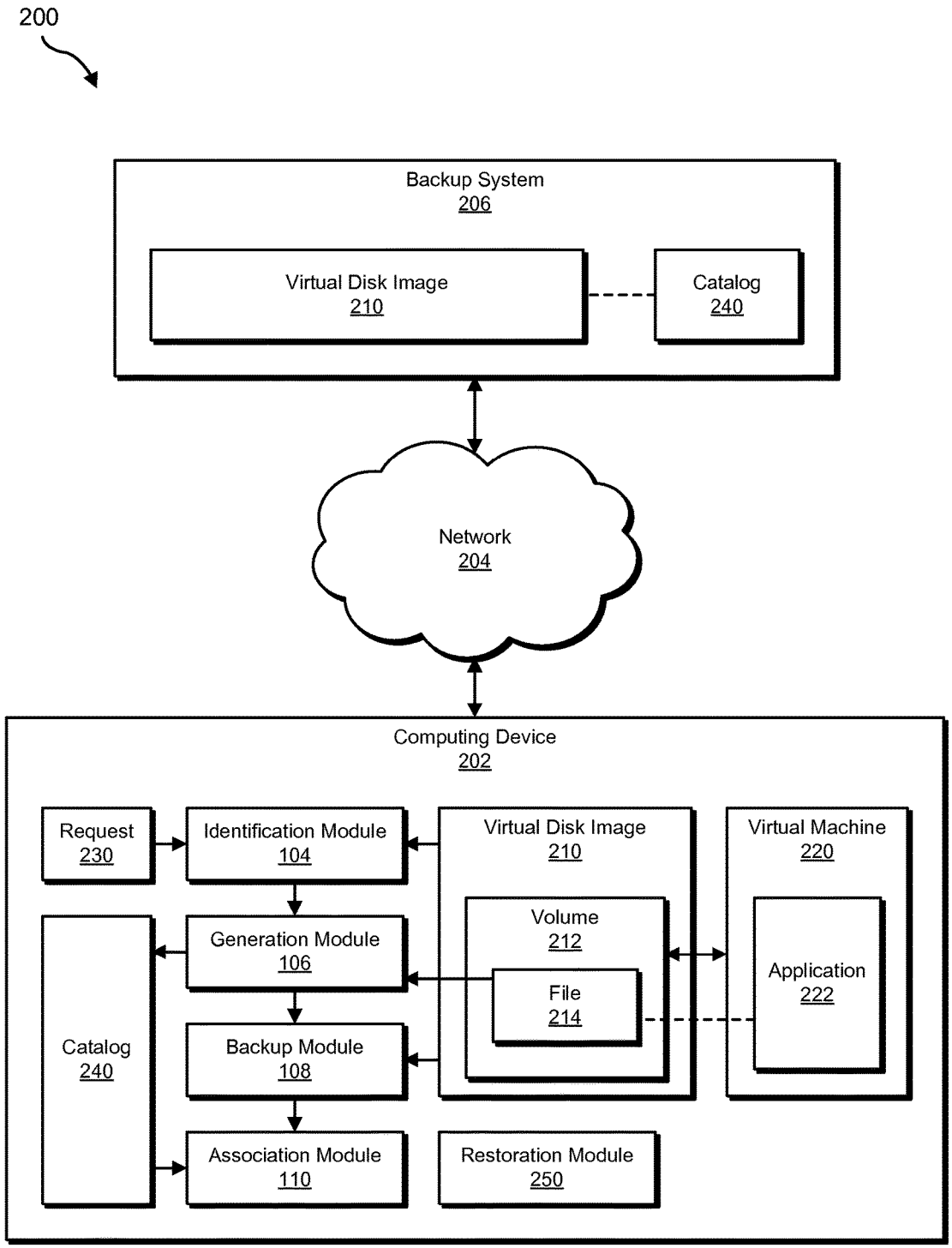
FIG. 2 is a block diagram of an exemplary system for restoring application data.
Figure 3:
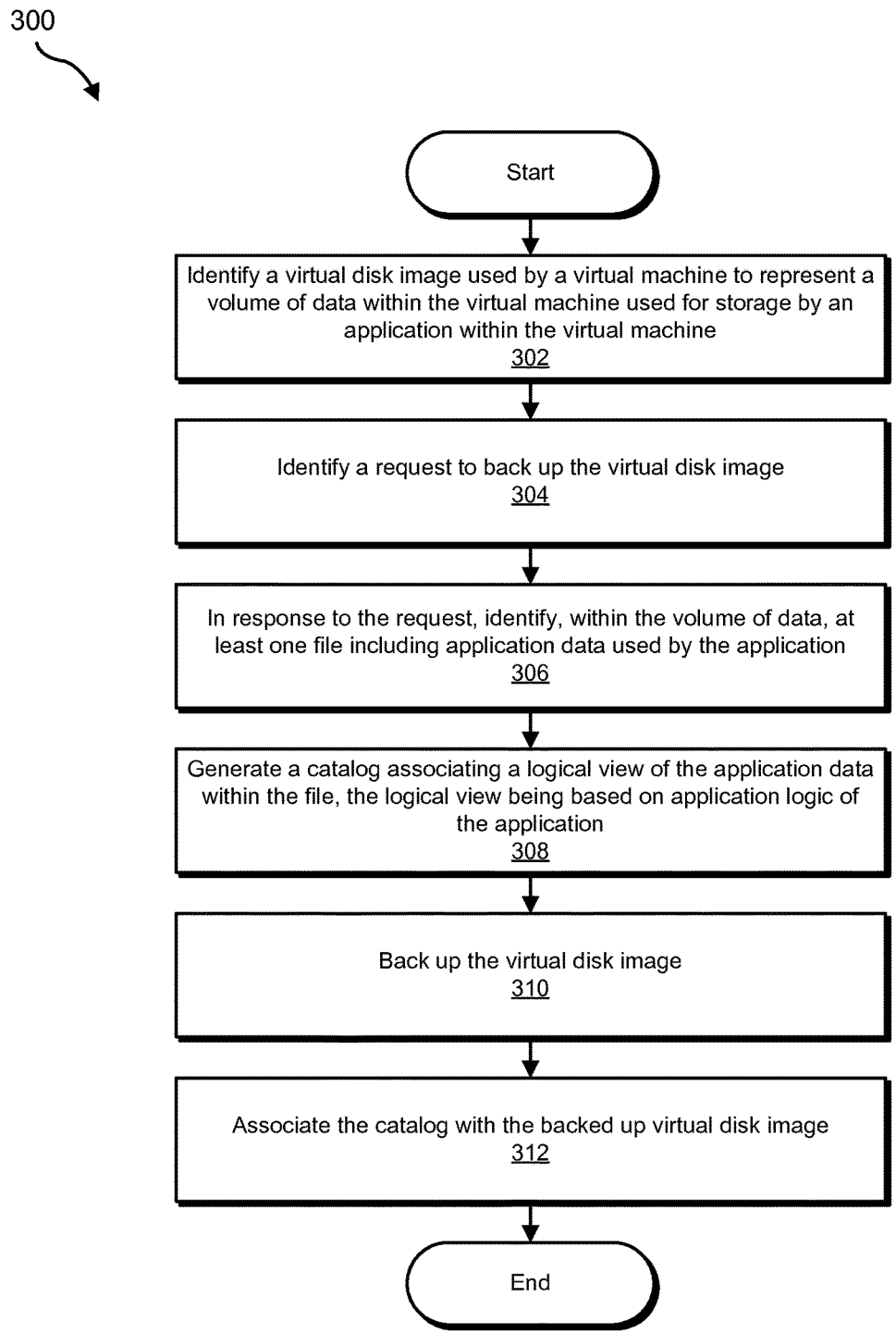
FIG. 3 is a flow diagram of an exemplary method for restoring application data.
Figure 4:
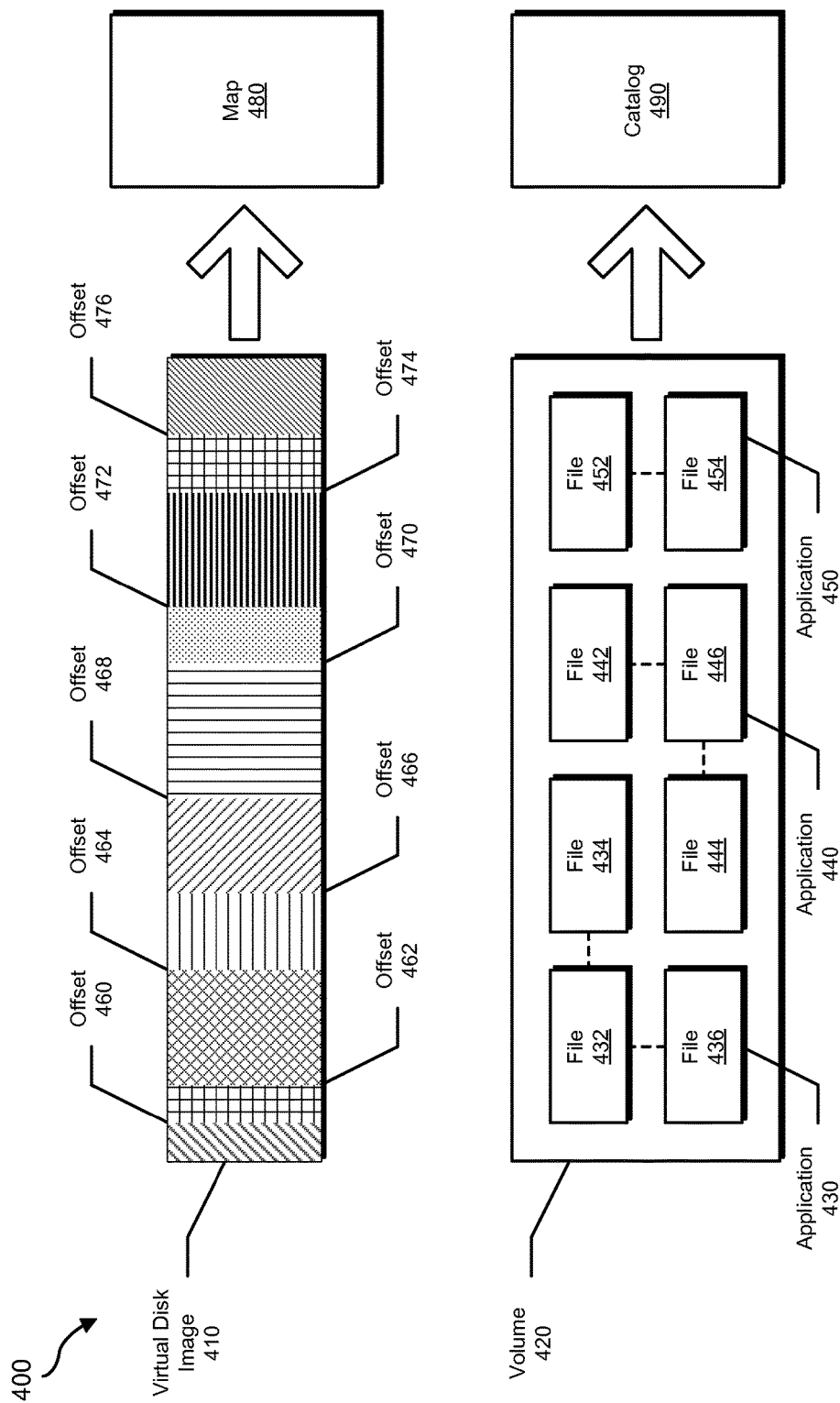
FIG. 4 is a block diagram of an exemplary system for restoring application data.

The following will provide, with reference to FIGS. 1, 2, and 4, detailed descriptions of exemplary systems for restoring application data. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for restoring application data. As illustrated in this figure, exemplary system 100 may include one or more modules 102 for performing one or more tasks. For example, and as will be explained in greater detail below, exemplary system 100 may include an identification module 104 programmed to (1) identify a virtual disk image used by a virtual machine to represent a volume of data within the virtual machine used for storage by an application within the virtual machine, (2) identify a request to back up the virtual disk image, and, in response to the request, (3) identify, within the volume of data, at least one file including application data used by the application. Exemplary system 100 may also include a generation module 106 programmed to generate a catalog associating a logical view of the application data with the file, the logical view being based on application logic of the application.

In addition, and as will be described in greater detail below, exemplary system 100 may include a backup module 108 programmed to back up the virtual disk image. Exemplary system 100 may also include an association module 110 programmed to associate the catalog with the backed up virtual disk image. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or backup system 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a backup system 206 via a network 204.

In one embodiment, one or more of modules 102 from FIG. 1 may, when executed by at least one processor of computing device 202, facilitate computing device 202 in restoring application data. For example, and as will be described in greater detail below, identification module 104, generation module 106, backup module 108, and association module 110 may cause computing device 202 to back up a virtual disk image along with metadata to facilitate an efficient restoration of application data within the virtual disk image. For example, identification module 104 may be programmed to identify a virtual disk image 210 used by a virtual machine 220 to represent a volume 212 within virtual machine 220 used for storage by an application 222 within virtual machine 220. Identification module 104 may also be programmed to identify a request 230 to back up virtual disk image 210. Identification module 104 may additionally be programmed to, in response to request 230, identify, within volume 212, at least one file (e.g., a file 214) including application data used by application 222. Generation module 106 programmed to generate a catalog 240 associating a logical view of the application data with file 214, the logical view being based on application logic of application 222. Backup module 108 may be programmed to back up virtual disk image 210 (e.g., via backup system 206). Association module 110 may be programmed to associate catalog 240 with virtual disk image 210 within backup system 206.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Backup system 206 generally represents any type or form of computing device that is capable of receiving, processing, storing, and/or retrieving data for backup. Examples of backup system 206 include, without limitation, application servers and database servers configured to provide various database services and/or run certain software applications. Additionally or alternatively, backup system 206 may include one or more storage devices for storing backup data.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and backup system 206.

FIG. 3 is a flow diagram of an exemplary computer-implemented method 300 for restoring application data. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a virtual disk image used by a virtual machine to represent a volume of data within the virtual machine used for storage by an application within the virtual machine. For example, at step 302 identification module 104 may, as part of computing device 202 in FIG. 2, identify virtual disk image 210 used by virtual machine 220 to represent volume 212 within virtual machine 220 used for storage by application 222 within virtual machine 220.

As used herein, the phrase "virtual disk image" may refer to any file or other data object containing data stored for the use of a virtual machine. In some examples, the data as stored within the virtual disk image may reflect the raw contents and/or structure of a virtual storage device.

As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications.

As used herein, the phrase "volume of data" may refer to any collection of data. Examples of a volume of data include, but are not limited to, a database, a file system partition, a logical volume, and/or a selected group of files. In some examples, the phrase "volume of data" as used herein may refer to a logical view of a virtual disk image from the perspective of a guest operating system.

FIG. 4 illustrates an exemplary system 400 for restoring application data. As shown in FIG. 4, system 400 may include a virtual disk image 410. Using FIG. 4 as an example, virtual disk image 410 may represent a raw data file stored on a host computing system to represent the contents of a virtual storage device for a virtual machine executing on the host computing system. A volume 420 may represent a logical view of the contents of virtual disk image 410 from the perspective of a guest operating system of the virtual machine (e.g., a file system of the guest operating system).

Returning to step 302 of FIG. 3, the application may include any of a variety of types of applications. For example, as will be explained in greater detail below, the application may include an e-mail server (e.g., MICROSOFT EXCHANGE SERVER), a content management system (e.g., MICROSOFT SHAREPOINT), and/or a database server (e.g., MICROSOFT SQL SERVER). Generally, the application may include any type of application that may execute within a virtual machine and store data within the volume of data.

Identification module 104 may identify the virtual disk image in any of a variety of contexts. For example, identification module 104 may receive a message and/or read a configuration file indicating that the virtual disk image is subject to application-granular backup and restoration. Additionally or alternatively, and as will be described in greater detail below, identification module 104 may identify a request to back up the virtual disk image. Using FIG. 4 as an example, identification module 104 may identify virtual disk image 410.

Returning to FIG. 3, at step 304 one or more of the systems described herein may identify a request to back up the virtual disk image. For example, at step 304 identification module 104 may, as part of computing device 202 in FIG. 2, identify request 230 to back up virtual disk image 210. Using FIG. 4 as an example, at step 304 identification module 104 may identify a request to back up virtual disk image 410.

Identification module 104 may identify the request to back up the virtual disk image in any suitable manner. For example, identification module 104 may receive a message from an application requesting that the virtual disk image be backed up. Additionally or alternatively, identification module 104 may intercept an attempt by a backup system to back up the virtual disk image. In some examples, identification module 104 may read a backup schedule indicating that the virtual disk image is scheduled for backup.

The request may include any of a variety of information. For example, the request may include a request to back up the entire virtual disk image in a raw (e.g., unchanged) format. Additionally or alternatively, the request may include a request to back up the application (e.g., application data corresponding to the application). In some examples, the request may explicitly or implicitly include a request to back up the virtual disk image and/or the application in such a way as to facilitate a restoration of the application without requiring the restoration of the entire virtual disk image. In some examples, the request may include a request to back up the virtual disk image to a sequential storage device (e.g., a tape-based storage device). In these examples, identification module 104 may identify the request as a request to back up the virtual disk image to a sequential storage device. In some examples, one or more of the systems described herein may perform one or more of the steps described herein based on identification module 104 identifying the request as a request to back up the virtual disk image to the sequential storage device.

Returning to FIG. 3, at step 306 one or more of the systems described herein may, in response to the request, identify, within the volume of data, at least one file including application data used by the application. For example, at step 306 identification module 104 may, as part of computing device 202 in FIG. 2, in response to request 230, identify, within volume 212, file 214 including application data used by application 222. Using FIG. 4 as an example, at step 306 identification module 104 may identify within volume 420 files 442, 444, and 446 including application data used by an application 440.

As used herein, the phrase "application data" may refer to any data processed, maintained, and/or stored by an application. Additionally or alternatively, the phrase "application data" may refer to any data that affects the state of an application. For example, the application may include an e-mail server. In this example, identification module 104 may identify a database file including mailbox data. Identification module 104 may also identify a transaction log file (e.g., including operations to commit to the database) and a checkpoint file (e.g., for indicating whether operations have successfully been saved to the database). In another example, the application may include a content management system. In this example, identification module 104 may identify a database file for the content management system. In an additional example, the application may include a database server. In this example, identification module 104 may identify one or more database files maintained by the database server.

Identification module 104 may identify the file in any of a variety of ways. For example, identification module 104 may determine that the file contains application data by reading from a configuration file that maps file names and/or locations to the application. Additionally or alternatively, identification module 104 may determine that the file contains application data by determining that the file is located within a directory designated for data used by the application. In some examples, identification module 104 may determine that the file contains application data by determining that the application has read from and/or written to the file. Additionally or alternatively, identification module 104 may determine that the file contains application data by receiving a message identifying the file as containing application data for the application. For example, identification module 104 may receive a message from an agent executing within the virtual machine identifying the file as corresponding to the application.

Returning to FIG. 3, at step 308 one or more of the systems described herein may generate a catalog associating a logical view of the application data with the file, the logical view being based on application logic of the application. For example, at step 308 generation module 106 may, as part of computing device 202 in FIG. 2, in response to request 230, generate a catalog 240 associating a logical view of the application data with file 214, the logical view being based on application logic of application 222. Using FIG. 4 as an example, at step 308 generation module 106 may generate a catalog 490 associating a logical view of data for application 440 with files 442, 444, and 446 based on application logic of application 440.

The catalog may include any suitable file and/or data structure. In some examples, the catalog may be organized according to an existing catalog format used for browsing data within the application. The logical view of the application data may include any view relating to the application data to the application. For example, the logical view may include associating the file with a name of the application (or another suitable application identifier). Accordingly, in some examples the application logic may include the fact that the application uses the data within the file. Additionally or alternatively, the logical view may include associating one or more portions of the file with a logical component and/or data structure used by the application.

In some examples, generation module 106 may generate the catalog using an agent executing within the virtual machine. Additionally or alternatively, generation module 106 may operate as a part of the agent executing within the virtual machine. For example, the agent may take an application-aware snapshot within the virtual machine of the application data (e.g., including the file). The agent may then catalog the application data and pass the catalog to generation module 106.

In addition to generating the catalog associating the logical view of the application data with the file, generation module 106 may generate a map that indicates an offset within the virtual disk image at which the file is stored. For example, generation module 106 may use an agent executing within the virtual machine to gather information from the file system of the guest operation system of the virtual machine regarding the location of the file within the virtual disk. The map may generally include any suitable data structure for associating the file with the location within the virtual disk image at which the file is stored. In some examples, a single data structure may include both the catalog and the map. Using FIG. 4 as an example, virtual disk image 410 may represent raw data stored on the virtual disk of the virtual machine. In one example, a file 432 may be stored on virtual disk image at an offset 460 of virtual disk image 410. Likewise, a file 434 may be stored at an offset 462, file 442 may be stored at an offset 464, a file 452 may be stored at an offset 466, a file 436 may be stored at an offset 468, file 444 may be stored at an offset 470, file 446 may be stored at an offset 472, and a file 454 may be stored at an offset 474. In this example, generation module 106 may generate catalog 490 to record the logical association between files 442, 444, and 446 and application 440. Generation module 106 may also generate a map 480 to record that file 442 corresponds to offset 464, file 444 corresponds to offset 470, and file 446 corresponds to offset 472. While depicted separately, in some examples, generation module 106 may generate map 480 and catalog 490 as a single, integrated data structure.

In some examples, generation module 106 may also generate application metadata. As used herein, the phrase "application metadata" may refer to any information that describes, gives structure to, organizes, and/or contextualizes application data so as to facilitate the restoration of the application data. Generation module 106 may generate the application metadata in any of a variety of formats, including, without limitation, text-based lists, hierarchical descriptions (e.g., XML documents), and binary files (e.g., generated by a snapshot provider and/or a backup system). In some examples, generation module 106 may store the application metadata on the volume of data within the virtual machine. In this manner, as will be described in greater detail below, one or more of the systems and methods described herein may back up the application metadata as part of the virtual disk image.

Generation module 106 may generate the application metadata in any suitable context. For example, generation module 106 may generate the application metadata using an agent executing within the virtual machine. Additionally or alternatively, generation module 106 may operate as a part of the agent executing within the virtual machine.

Returning to FIG. 3, at step 310 one or more of the systems described herein may back up the virtual disk image. For example, at step 310 backup module 108 may, as part of computing device 202 in FIG. 2, in response to request 230, back up virtual disk image 210 (e.g., via backup system 206). Using FIG. 4 as an example, at step 310 backup module 108 may back up virtual disk image 410.

Backup module 108 may perform step 310 in any suitable manner. In some examples, backup module 108 may back up the virtual disk image in a virtual disk image format. For example, backup module 108 may back up the raw virtual disk image, representing the format of a corresponding virtual disk. Backup module 108 may back up the virtual disk image to any suitable backup storage device. In some examples, backup module 108 may back up the virtual disk image to a sequential storage device (e.g., a tape-based storage device).

As mentioned earlier, in some examples, one or more of the systems and methods described herein may have stored application metadata useful for restoring the application within the virtual disk image. Accordingly, backup module 108 may back up the application metadata simply by backing up the virtual disk image. As will be described in greater detail below, one or more of the systems and methods described herein may later retrieve the application metadata and use the application metadata for restoring the application.

At step 312 one or more of the systems described herein may associate the catalog with the backed up virtual disk image. For example, at step 312 association module 110 may, as part of computing device 202 in FIG. 2, in response to request 230, associate catalog 240 with virtual disk image 210 within backup system 206. Using FIG. 4 as an example, at step 312 association module 110 may associate catalog 490 with virtual disk image 410.

Association module 110 may associate the catalog with the backed up virtual disk image in any suitable manner. For example, association module 110 may maintain a data structure specifying that the catalog pertains to the backed up virtual disk image. In some examples, association module 110 may associate the catalog with the backed up virtual disk image by storing the catalog with the backed up virtual disk image. Additionally or alternatively, association module 110 may store the catalog separately (e.g., on a backup server).

As mentioned earlier, in some examples one or more of the systems described herein may generate and/or identify a map indicating an offset within the virtual disk image at which the file is stored. In some examples, association module 110 may also associate the map with the catalog and/or associate the map with the virtual disk image. After step 312, method 300 may terminate.

Figure 5:
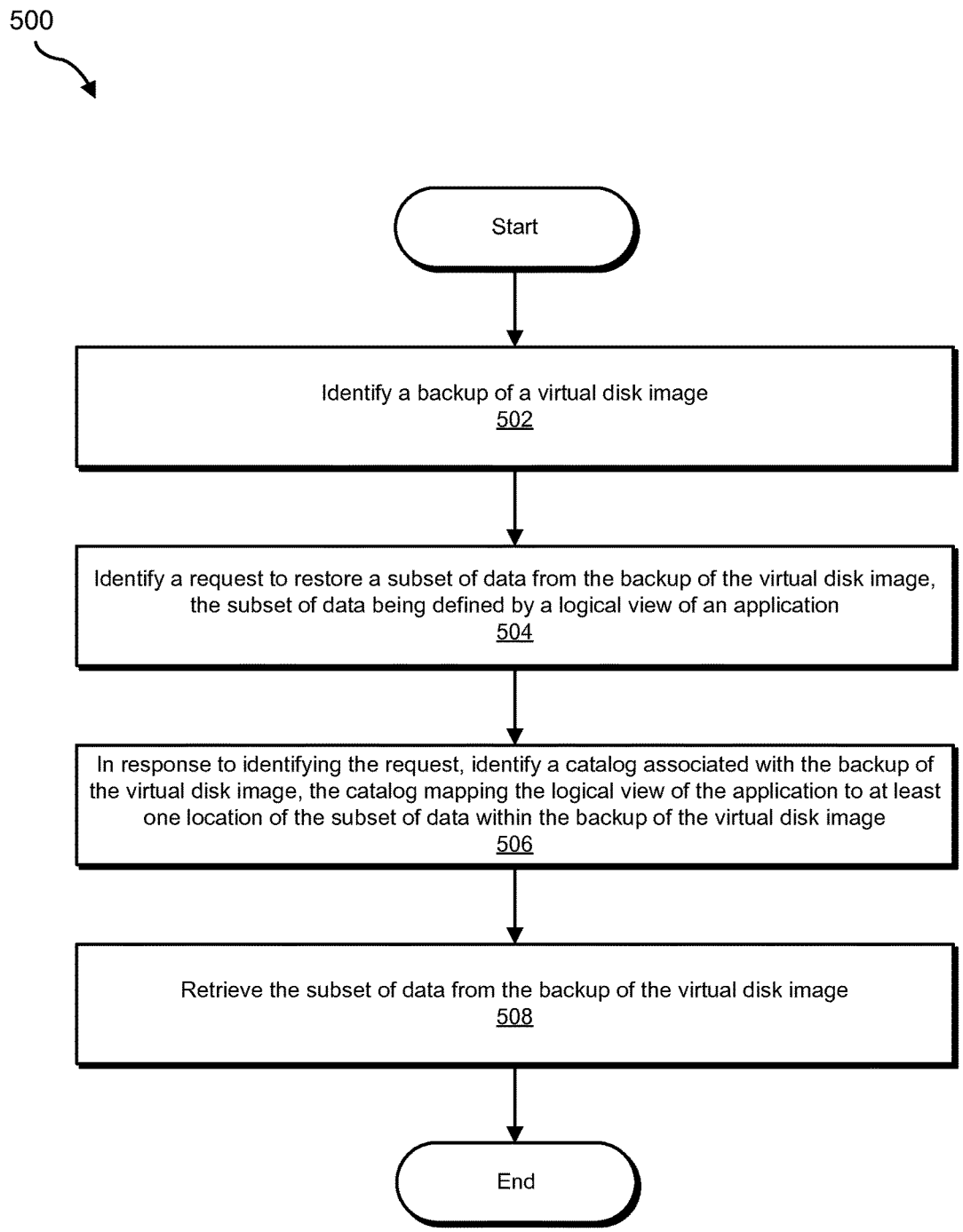
FIG. 5 is a flow diagram of an exemplary method for restoring application data.

FIG. 5 is a flow diagram of an exemplary computer-implemented method 500 for restoring application data. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, computing system 610 in FIG. 6, and/or portions of exemplary network architecture 700 in FIG. 7.

As illustrated in FIG. 5, at step 502 one or more of the systems described herein may identify a backup of a virtual disk image. For example, at step 502 restoration module 250 may, as part of computing device 202 in FIG. 2, identify virtual disk image 210 within backup system 206.

Restoration module 250 may identify the backup of the virtual disk image in any suitable manner. For example, restoration module 250 may identify the backup of the virtual disk image by receiving a request to restore data from the backup of the virtual disk image.

At step 504 one or more of the systems described herein may identify a request to restore a subset of data from the backup of the virtual image, the subset of data being defined by a logical view of an application. For example, at step 504 restoration module 250 may, as part of computing device 202 in FIG. 2, identify a request to restore data within file 214 from virtual disk image 210 within backup system 206. Using FIG. 4 as an example, at step 504 restoration module 250 may identify a request to restore files 442, 444, and 446 corresponding to application 440.

Restoration module 250 may identify the request to restore the subset of data in any suitable manner. In some examples, restoration module 250 may allow a user to browse through the backup of the virtual image according to a logical view of one or more applications. For example, as will be described in greater detail below, restoration module 250 may identify a catalog associating one or more files within the backup of the virtual image with a logical view of one or more applications. Accordingly, based on the catalog, restoration module 250 may present the application and/or allow a user to select the application (and/or data components thereof) for restoration.

At step 506 one or more of the systems described herein may, in response to identifying the request, identify a catalog associated with the backup of the virtual disk image, the catalog mapping the logical view of the application to at least one location of the subset of data within the backup of the virtual disk image. For example, at step 506 restoration module 250 may, as part of computing device 202 in FIG. 2, identify catalog 240. Using FIG. 4 as an example, at step 506 restoration module 250 may identify catalog 490.

In some examples, the catalog may map the logical view of the application to at least one location of the subset of data by mapping the logical view of the application to at least one file within the virtual disk image that includes at least a portion of the subset of data. For example, as mentioned earlier, the logical view may include associating the file with a name of the application (or another suitable application identifier). Additionally or alternatively, the logical view may include associating one or more portions of the file with a logical component and/or data structure used by the application.

In some examples, restoration module 250 may also identify a map that indicates an offset within the virtual disk image at which the file is stored. As will be explained in greater detail below, in these examples, retrieving the subset of data from the backup may be further based on the map.

At step 508 one or more of the systems described herein may retrieve the subset of data from the backup of the virtual disk image based on the catalog. For example, at step 508 restoration module 250 may, as part of computing device 202 in FIG. 2, retrieve file 214 (or a portion thereof) from virtual disk image 210 within backup system 206. Using FIG. 4 as an example, at step 508 restoration module 250 may retrieve files 442, 444, and 446 from the backup of virtual disk image 410 based on catalog 490.

Restoration module 250 may retrieve the subset of data from the backup of the virtual disk image in any suitable manner. For example, restoration module 250 may simply restore files identified as pertaining to the application according to the catalog. In some examples, restoration module 250 may retrieve the file from the backup of the virtual disk image and identify, based on the logical view of the application, a location within the file at which at least a portion of the subset of data resides. In these examples, restoration module 250 may then retrieve the portion of the subset of data from the location within the file. For example, the catalog may identify one or more data structures encoded within the file that are used by the application such that the data structures may be presented and/or made available for granular restoration.

In some examples, restoration module 250 may retrieve the subset of data from the virtual disk image without mounting the virtual disk image. For example, as mentioned earlier, one or more of the systems described herein may have mapped the offset at which the file is stored within the virtual disk image. Accordingly, restoration module 250 may read raw data from the offset within the virtual disk image to retrieve the subset of data. In one example, restoration module 250 may retrieve the subset of data from a sequential access storage device in sequential order. For example, by knowing the offsets at which the relevant data is stored within the virtual disk image, restoration module may directly seek those portions of the backed up virtual disk image for reading rather than retrieving the entire virtual disk image from the sequential access storage device and then reading from the virtual disk image to retrieve the subset of data.

In some examples, restoration module 250 may also retrieve application metadata pertaining to the application from the backup of the virtual disk image based on the catalog. In these examples, restoration module 250 may retrieve the application metadata to aid in interacting with one or more application interfaces of the application on the virtual machine. For example, restoration module 250 may use the application metadata to interact with one or more application interfaces to complete, commit, and/or enable the restoration of the application after the subset of data has been restored. In some examples, restoration module 250 may use the application metadata to determine how to interact with one or more application interfaces of the application to restore application data from the subset of data with application-level granularity.

Restoration module 250 may retrieve the application data in any suitable manner. For example, restoration module 250 may retrieve the application data by retrieving a file from the backup of the virtual disk image and then identifying, based on the logical view of the application, a location within the file at which at least a portion of the application metadata resides. Restoration module 250 may then retrieve the portion of the application metadata from the location within the file.

In some examples, restoration module 250 may retrieve the application metadata from the backup of the virtual disk image without mounting the virtual disk image. Additionally or alternatively, restoration module 250 may retrieve the application metadata from the backup of the virtual disk image by retrieving the application metadata from a sequential access storage device in sequential order.

As explained above, by cataloging application data within a virtual machine, backing up a disk image of the virtual machine, and associating the application data catalog with the backup of the disk image, the systems and methods described herein may facilitate application-granular restoration of data for virtual machines from virtual disk images (e.g., without requiring separate application-granular backups or full restorations). Accordingly, these systems and methods may increase the efficiency and/or flexibility of backup and restore operations relating to applications within virtual machines.

Figure 6:
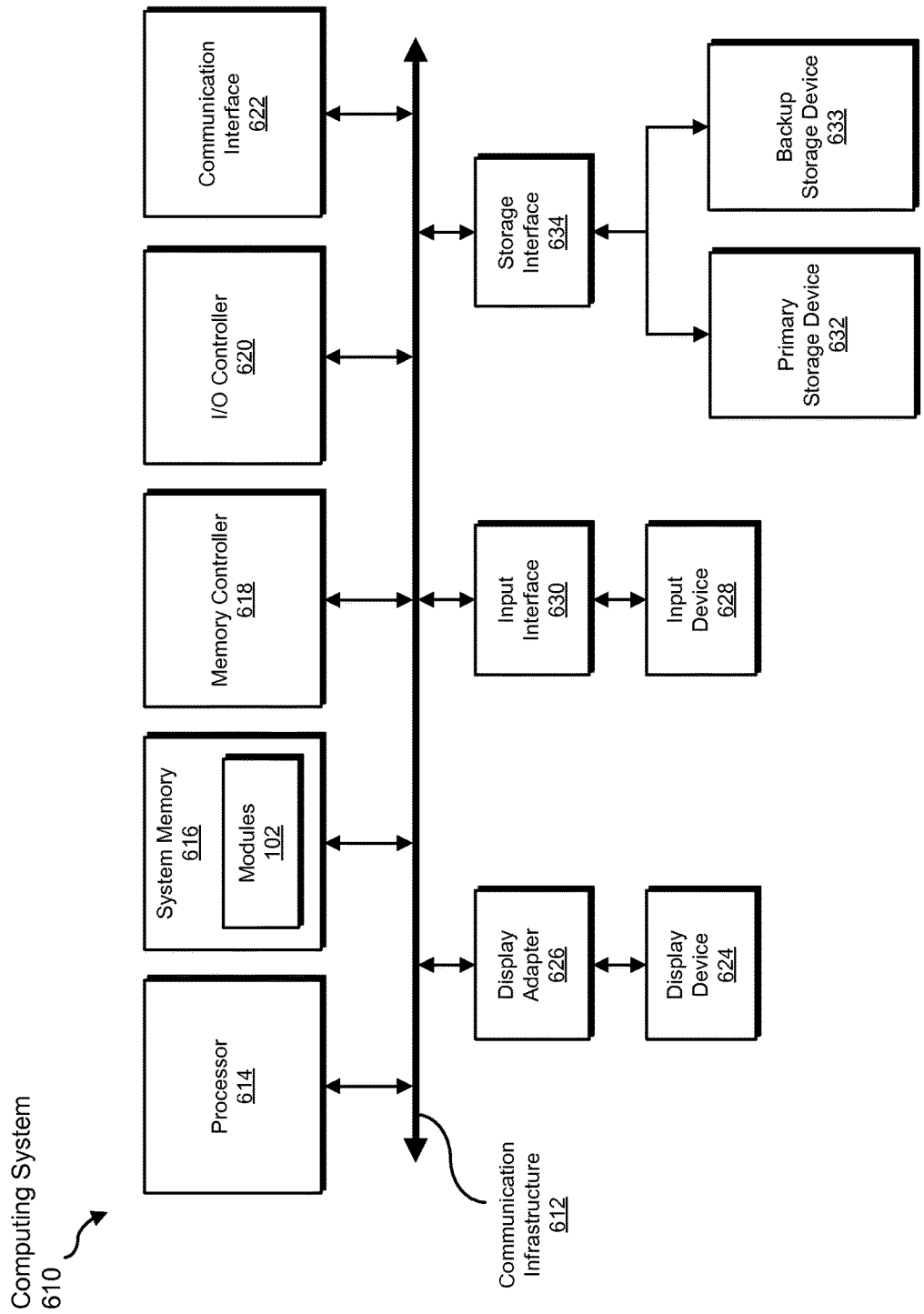
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, generating, backing up, associating, and/or retrieving steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a diskette drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a diskette, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
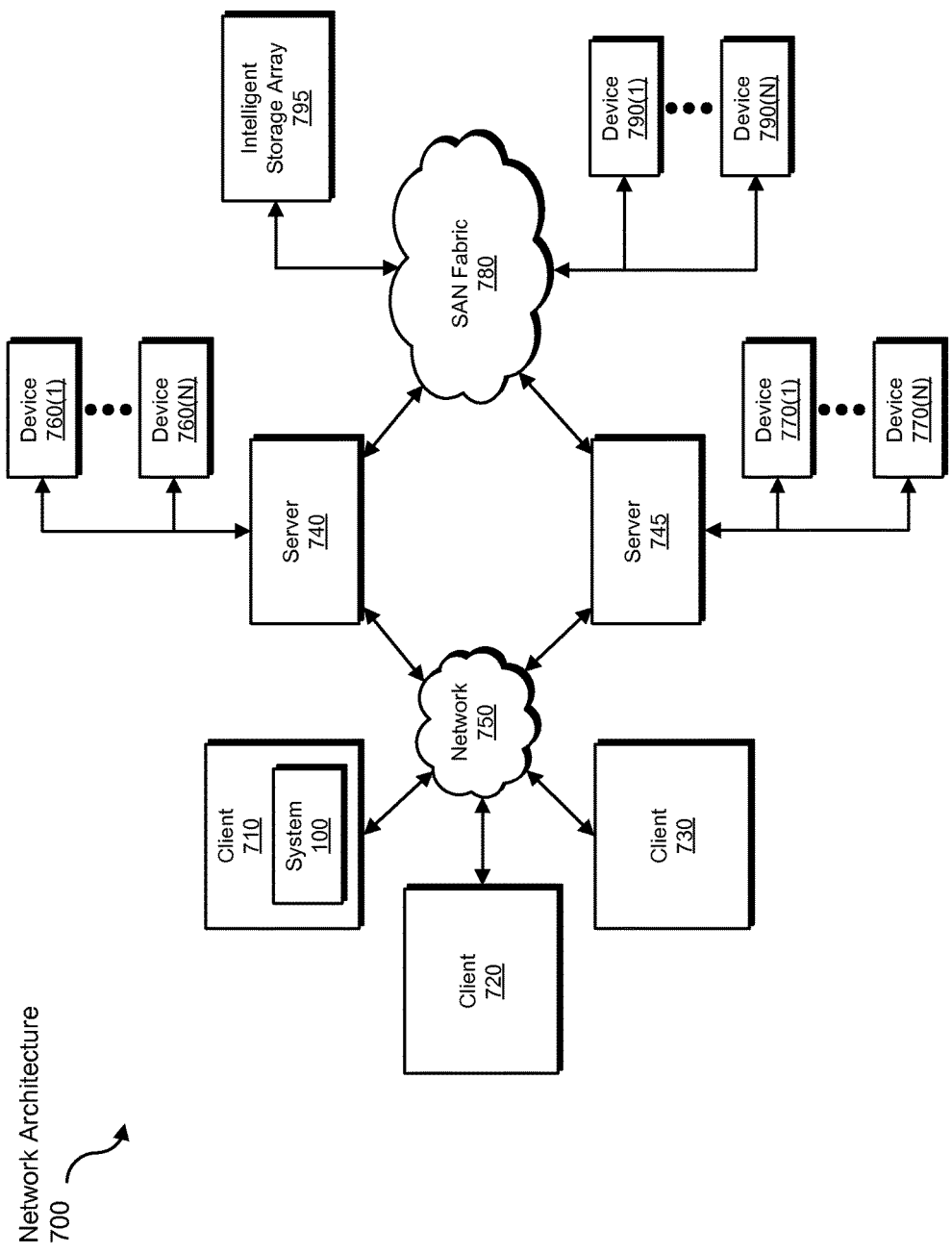
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, generating, backing up, associating, and/or retrieving steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for restoring application data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script files, job control files, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for efficiently backing up and/or restoring applications within virtual machines.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for restoring application data, at least a portion of the method being performed by a computing device comprising at least one processor, the method comprising:
   identifying a virtual disk image comprising data stored for the use of a virtual machine executing on a host computing system, wherein:
      the virtual machine does not have a direct correspondence to hardware of an underlying host machine;
      a subset of the data represents a volume of data within the virtual machine used for storage by an application within the virtual machine;
   identifying a request to back up the entire virtual disk image in a raw unchanged format in such a way as to facilitate a restoration of the application without requiring a restoration of the entire virtual disk image;
   in response to the request to back up the entire virtual disk image:
      identifying, within the volume of data used by the application, at least one file comprising application data used by the application;
      generating an application data catalog comprising each of a reference to the file, a reference to the application data, and a reference to the application, wherein:
         the application data catalog associates a logical view of the application data with the file;
         the logical view is based on application logic of the application; and
         the application data catalog conveys that the application uses the application data within the file;
      backing up the virtual disk image; and
      associating the application data catalog with the backed up virtual disk image;
   after backing up the virtual disk image, identifying a request to restore a subset of the data included within the backup of the virtual disk image, the requested subset of data being defined by a logical view of the application, without restoring the entire backup of the virtual disk image; and
   in response to identifying the request, retrieving the requested subset of data from the backup of the virtual disk image based on the application data catalog, without restoring the entire backup of the virtual disk image.

2. The computer-implemented method of claim 1, wherein:
   the method further comprises, in response to the request to back up the entire virtual disk image, generating a map that indicates an offset within the virtual disk image at which the at least one file is stored; and
   retrieving the requested subset of data from the backup comprises retrieving the requested subset of data without mounting the virtual disk image by reading raw data from the offset within the virtual disk image to retrieve the subset of data.

3. The computer-implemented method of claim 1, wherein:
   identifying the request to back up the entire virtual disk image comprises identifying a request to back up the entire virtual disk image to a sequential storage device; and
   retrieving the requested subset of data from the backup of the virtual disk image comprises retrieving the requested subset of data from the sequential storage device in sequential order.

4. The computer-implemented method of claim 3, wherein retrieving the requested subset of data in sequential order comprises:
   identifying the offsets at which relevant data is stored within the virtual disk image; and
   directly seeking out the portions of the backed up virtual disk image for reading rather than retrieving the entire virtual disk image from the sequential storage device and then reading from the virtual disk image to retrieve the subset of data.

5. The computer-implemented method of claim 1, wherein:
   generating the application data catalog comprises generating the application data catalog using an agent executing within the virtual machine;
   the agent takes an application-aware snapshot within the virtual machine of the application data, the application-aware snapshot comprising the file;
   the agent catalogs the application data based on the application-aware snapshot; and
   using the agent to generate the application data catalog comprises receiving the application data catalog from the agent.

6. The computer-implemented method of claim 1, wherein:
   the application comprises an email server; and
   identifying the at least one file comprises identifying at least one of:
      a datable file comprising mailbox data;
      a transaction log file comprising operations to commit to a database; and
      a checkpoint file for indicating whether operations have successfully been saved to a database.

7. The computer-implemented method of claim 1, wherein:
   the application comprises a database server; and
   identifying the at least one file comprises identifying a database file maintained by the database server.

8. The computer-implemented method of claim 1, wherein:
   the application comprises a content management system; and
   identifying the at least one file comprises identifying a database file for the content management system.

9. The computer-implemented method of claim 1, wherein:
   the method further comprises storing, within the virtual disk image, application metadata useful for restoring the application within the virtual disk image; and
   retrieving the requested subset of data from the backup of the virtual disk image further comprises retrieving, without mounting the virtual disk image, the application metadata from the backup of the virtual disk image and using the application metadata for restoring the application.

10. A system for restoring application data, the system comprising:
    an identification module programmed to:
       identify a virtual disk image comprising data stored for the use of a virtual machine executing on a host computing system, wherein:

the virtual machine does not have a direct correspondence to hardware of an underlying host machine; and a subset of the data represents a volume of data within the virtual machine used for storage by an application within the virtual machine;

identify a request to back up the entire virtual disk image in a raw unchanged format in such a way as to facilitate a restoration of the application without requiring a restoration of the entire virtual disk image; and in response to the request to back up the entire virtual disk image, identify, within the volume of data used by the application, at least one file comprising application data used by the application;

a generation module programmed to generate an application data catalog comprising each of a reference to the file, a reference to the application data, and a reference to the application, wherein:

the application data catalog associates a logical view of the application data with the file;

the logical view is based on application logic of the application; and the application data catalog conveys that the application uses the application data within the file;

a backup module programmed to back up the virtual disk image;

an association module programmed to associate the application data catalog with the backed up virtual disk image;

a restoration module programmed to:

identify a restoration request to restore a subset of the data included within the backup of the virtual disk image, the requested subset of data being defined by a logical view of the application, without restoring the entire backup of the virtual disk image; and in response to identifying the restoration request:
identify the application data catalog; and
retrieve the subset of data from the backup of the virtual disk image based on the application data catalog, without restoring the entire backup of the virtual disk image; and at least one processor configured to execute the identification module, the generation module, the backup module, the association module, and the restoration module.

11. The system of claim 10, wherein the generation module is further programmed to, in response to the request to back up the entire virtual disk image, generate a map that indicates an offset within the virtual disk image at which the file is stored.

12. The system of claim 10, wherein the backup module is programmed to back up the virtual disk image by backing up the virtual disk image in a virtual disk image format.

13. The system of claim 10, wherein the generation module is programmed to generate the application data catalog associating the logical view of the application data with the file by associating the file with a name of the application in the application data catalog.

14. The system of claim 10, wherein:
the file comprises the requested subset of data; and
the application data catalog maps the logical view of the application to at least one location of the subset of data by mapping the logical view of the application to the file.

15. The system of claim 14, wherein the restoration module is further programmed to identify a map that indicates an offset within the virtual disk image at which the file is stored, wherein retrieving the requested subset of data from the backup of the virtual disk image is further based on the map.

16. The system of claim 14, wherein the restoration module is programmed to retrieve the requested subset of data from the backup of the virtual disk image based on the application data catalog by:

retrieving the file from the backup of the virtual disk image;

identifying, based on the logical view of the application, a location within the file at which at least a portion of the subset of data resides; and retrieving the portion of the subset of data from the location within the file.

17. The system of claim 10, wherein the restoration module is programmed to retrieve the requested subset of data from the backup of the virtual disk image by retrieving the subset of data from the virtual disk image without mounting the virtual disk image.

18. A non-transitory computer-readable medium comprising one or more computer-readable instructions that, when executed by at least one processor of a computing device, cause the computing device to:

identify a virtual disk image comprising data stored for the use of a virtual machine executing on a host computing system, wherein:

the virtual machine does not have a direct correspondence to hardware of an underlying host machine; and a subset of the data represents a volume of data within the virtual machine used for storage by an application within the virtual machine;

identify a request to back up the entire virtual disk image in a raw unchanged format in such a way as to facilitate a restoration of the application without requiring a restoration of the entire virtual disk image;

in response to the request to back up the entire virtual disk image:

identify, within the volume of data used by the application, at least one file comprising application data used by the application;

generate an application data catalog comprising each of a reference to the file, a reference to the application data, and a reference to the application, wherein:

the application data catalog associates a logical view of the application data with the file;

the logical view is based on application logic of the application; and the application data catalog conveys that the application uses the application data within the file;

back up the virtual disk image; and associate the application data catalog with the backed up virtual disk image;

after backing up the virtual disk image, identify a request to restore a subset of the data included within the backup of the virtual disk image, the requested subset of data being defined by a logical view of the application, without restoring the entire backup of the virtual disk image; and in response to identifying the request, retrieve the requested subset of data from the backup of the virtual disk image based on the application data catalog, without restoring the entire backup of the virtual disk image.

19. The computer-implemented method of claim 9, wherein using the application metadata for restoring the application comprises using the application metadata to determine how to interact with one or more application interfaces of the application to restore application data from the requested subset of data with application-level granularity.

20. The computer-implemented method of claim 9, wherein using the application metadata for restoring the application comprises using the application metadata to interact with one or more application interfaces of the application on the virtual machine to at least one of complete, commit, and enable the restoration of the application after the requested subset of data has been restored.

\* \* \* \* \*